United States Patent [19]

Eckard et al.

[11] Patent Number: 4,933,941
[45] Date of Patent: Jun. 12, 1990

[54] APPARATUS AND METHOD FOR TESTING THE OPERATION OF A CENTRAL PROCESSING UNIT OF A DATA PROCESSING SYSTEM

[75] Inventors: Clinton B. Eckard, Glendale; Marion G. Porter; Dwaine C. Pfeifer, both of Phoenix; David S. Edwards, Phoenix, all of Ariz.

[73] Assignee: Honeywell Bull Inc., Phoenix, Ariz.

[21] Appl. No.: 203,488

[22] Filed: Jun. 7, 1988

[51] Int. Cl.⁵ ............................................. G06F 11/00
[52] U.S. Cl. .................................. 371/18; 371/16.2; 371/23
[58] Field of Search ........................ 371/18, 16, 20, 25, 371/23, 16.1, 16.2, 22.1, 22.5, 25.1; 364/200 MS File

[56] References Cited

U.S. PATENT DOCUMENTS

| | | | |
|---|---|---|---|
| 4,190,885 | 2/1980 | Joyce | 364/200 |
| 4,355,389 | 10/1982 | Sato | 371/18 |
| 4,553,201 | 11/1985 | Pollack | 371/16 X |
| 4,606,024 | 8/1986 | Glass | 371/18 X |
| 4,703,446 | 10/1987 | Momose | 371/20 X |

Primary Examiner—Jerry Smith
Assistant Examiner—Robert W. Beausoliel
Attorney, Agent, or Firm—James H. Phillips; John S. Solakian

[57] ABSTRACT

Apparatus is disclosed for incorporation in a central processing unit that permits a testing procedure to be executed on the central processing unit in a manner that simulates the normal operation of the central processing unit. The apparatus includes an auxiliary memory unit, in which the test programs are stored, and an auxiliary processor for controlling the central processing unit when the test procedure is initiated and for preparing the central processing unit for execution of the test procedures. Control apparatus of the central processing unit executes the test program retrieved from the auxiliary memory unit. The auxiliary processor regains control of the central processing unit after the test program has been executed, tests the results of the test procedure and returns control to the central processing unit.

18 Claims, 5 Drawing Sheets

APPARATUS AND METHOD FOR TESTING THE OPERATION OF A CENTRAL PROCESSING UNIT OF A DATA PROCESSING SYSTEM

BACKGROUND OF THE INVENTION

1. Field of the Invention

This invention relates generally to data processing systems and, more particularly, to apparatus and a related procedure, incorporated in the central processing unit of a data processing system, which tests the central processing unit in a manner similar to the actual operation of the system.

2. Description of the Related Art

Referring first to FIG. 1, a data processing system, including the components necessary to understand the features of the present invention, is shown. The central processing unit 10 includes apparatus for performing the processing of data signal groups, typically stored in the main memory unit 13, in accordance with programs stored as instruction signal groups in the main memory unit 13. The system interface unit 11 provides buffer and control functions for signal groups being transferred into or out of the central processing unit 10. In addition to coupling the central processing unit 10 to the main memory unit 13, the system interface unit 11 provides buffer and control functions for signal groups exchanged between user terminals 12, mass storage units 14, communication devices 15 and any other apparatus exchanging signal groups with the central processing unit 10. A console unit 16 is typically coupled to the central processing unit 10 and includes apparatus for initiating operation of the data processing system, for providing selected control functions and for providing apparatus and programs for testing the apparatus of the central processing unit 10. In other data processing systems, the exchange of data with the central processing unit is accomplished over a system bus rather than through a system interface unit 11. The present invention will operate advantageously in both the data processing system bus type architecture and in the data processing system interface unit type architecture.

Referring specifically to the central processing unit 10 of FIG. 1, components thereof that are important in understanding the operation of the present invention are illustrated within the block labeled central processing unit 10. The signal groups, transferred into the central processing unit, are temporarily stored in the cache memory unit 103 until required by the currently executing program. Signal groups from the cache memory unit 103 are transferred to the operand register 102 and, subsequently, to the instruction register 104. The signal group in the instruction register 104 causes one or more signal groups from the operand register 102 to be processed by the execution unit 101. Signals from the instruction register 104 are applied to the control apparatus 106 which controls the processing of the data signal groups as well as transfer signal groups between components. The processed signal group is typically returned to the operand register group 102 and/or the cache memory unit 103. Thereafter, the processed signal group is transferred to the main memory unit 13 or to a user terminal 12 interacting with the central processing unit 10. Register array 105 is included to permit the central processing unit 10 to interrupt a currently executing procedure, execute a second procedure, e.g., a procedure having a higher priority, and return to the originally executing procedure. In order to return to the originally executing procedure at the point of interruption, the contents of selected registers are saved, i.e., transferred into register array 105, and the contents are returned to the (same) selected registers upon return to the originally executing procedure. As will be clear to those familiar with data processing systems, the foregoing description provides only an outline of the operation of a central processing unit 10. Data paths, control signal paths, associated apparatus, etc. have all been omitted although such apparatus is essential to the operation of central processing unit 10. In the preferred embodiment, the execution unit 101 has a pipelined configuration and is implemented using the techniques of microprogrammed control. In FIG. 1, the microprocessor control apparatus is designated as control apparatus 106. However, as will be clear, the microprogramming implementation as well as the pipelining techniques are not required for advantageous use of the present invention.

The complexity of the central processing unit 10 provides an enormous opportunity for malfunction. In order to verify the operation the central processing units, numerous procedure checking techniques, such as parity checking apparatus, can be incorporated in the central processing unit 10. Verification programs that are designed to check the operation of the central processing unit 10 can be stored in the main memory unit 13 or in the console unit 14. These verification programs are designed to exercise all the components of the central processing unit 10 and to provide processing results that can be compared with results known to be accurate. The verification programs are initiated in response to a detected error or in response to a maintenance strategy. The verification programs are lengthy and, in the event an error has not been detected, can occupy unacceptable amount of processing time when used as an operation verification mechanism. Part of the reason for the length of the verification program is that, for some programs, a portion of the central processing unit is exercised and the results compared against expected results. This type of program frequently executes a procedure for one or a few number of clock cycles in order to prevent confusion in the diagnostic procedures resulting from fan-out of errors. None-the-less, execution of verification programs is essential because many types of malfunctions do not produce detectable errors while still resulting in erroneous results.

More recently, a technique has been developed for testing the apparatus of a central processing unit that is known as non-functional or native fault testing (along with a multiplicity of other designations). In this technique, in response to control signals, typically from the console unit 14, the registers of the central processing unit are reconfigured into a single or relatively small number of shift registers. In this configuration, the contents of the shift register(s) can be shifted out of the central processing unit and the logic signal(s) in any predetermined register position (or positions) identified. Similarly, all the register positions of the central processing unit can have known signals entered therein (by means of the shift register configuration). Therefore, the initial state of the central processing unit can be determined and the resulting state, after a selected number of machine clock cycles, can be determined, thereby providing an operator with the ability to test the operation of the central processing unit at the gate level. This technique can interrupt the operation of the central processing unit for a relatively long period of time and does not truly exercise the central processing unit in the way that the central processing unit performs the processing functions.

A need has therefore been felt for apparatus and an associated technique that can verify the operation of a central processing unit in the manner in which the central processing unit is typically operated, while having a minimum impact of the availability of the central processing unit to execute user tasks. In addition, the test procedure should be capable of exercising the cache memory unit, an area of the central processing unit frequently overlooked by the test procedures currently available.

FEATURES OF THE INVENTION

It is an object of the present invention to provide an improved data processing system.

It is a feature of the present invention to provide apparatus and method for testing the operation of a data processing system.

It is another feature of the present invention to provide apparatus and method for testing a central processing unit of a data processing system.

It is yet another feature of the present invention to provide apparatus and a related process for testing the operation of a central processing unit in a manner that replicates the operation of the central processing unit.

It is a further feature of the present invention to provide apparatus and an associated technique for testing the operation of a central processing unit with minimum impact on the performance of the data processing system.

It is a still further feature of the present invention to provide apparatus and an associated technique for verification of the operation of a cache memory unit of a data processing system.

SUMMARY OF THE INVENTION

The aforementioned and other features are attained, according to the present invention, by providing an auxiliary processing unit and an auxiliary memory in the central processing unit. The auxiliary memory stores a group of programs capable of testing the apparatus of the central processing unit. The programs are divided into subsets of programs, each subset providing a executable entity. Execution of a program subset is initiated each time that the central processing system enters an idle state or is initiated in response to an external command. After initiation, the signal groups related to the initiated test program subset are transferred from the auxiliary memory to the operational components of the central processing unit including the cache memory unit and control signals are applied to the central processing unit control apparatus. The test program subset is thereafter executed by the central processing unit as if the signal groups had been retrieved from the main memory unit. After the program subset is executed, the results of the execution are compared with expected results. As long as the central processing unit has no other task awaiting execution, the central processing unit can continue the test program execution. When the test program is initiated by external command, a predetermined number of test program subsets are executed.

These and other features of the invention will be understood upon reading of the following description along with the drawings.

DESCRIPTION OF THE PREFERRED EMBODIMENT

1. Detailed Description of the Figures

Figure 1:
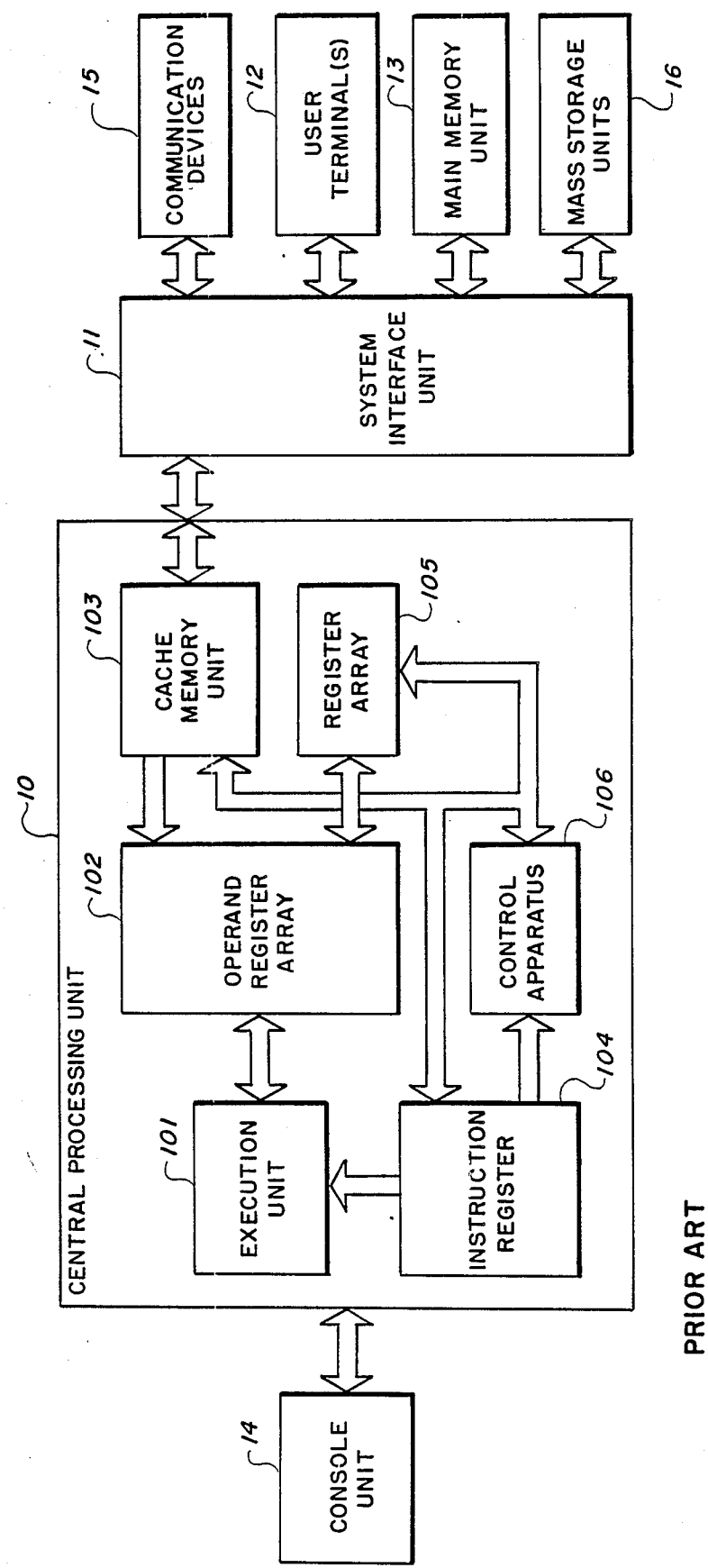
FIG. 1 is a block diagram of a data processing system according to the prior art illustrating system components necessary to understanding the present invention.

FIG. 1 has been described with relation to the related art.

Figure 2:
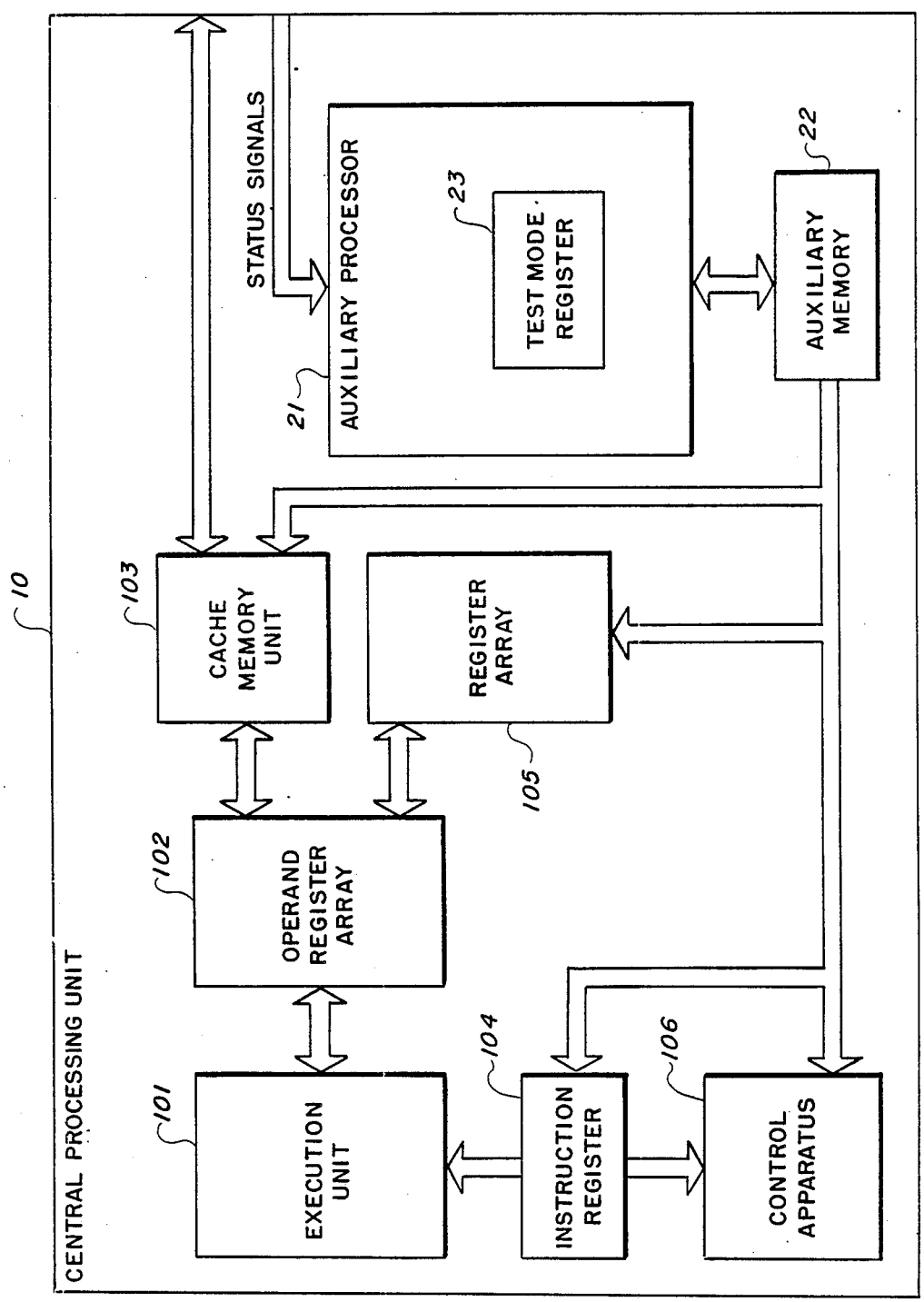
FIG. 2, is a block diagram of a central processing unit illustrating the additional components required to implement the present invention.

Referring now to FIG. 2, the functional block diagram of the central processing unit 10 according to the present invention is shown. The apparatus previously incorporated in the central processing unit 10 is retained. This retained apparatus includes the execution unit 101, the operand register 102, the cache memory unit 103, the instruction register 104 and the control apparatus 106. To the apparatus of the central processing unit is added an auxiliary processor 21 and an auxiliary memory 22. The auxiliary processor 21 is coupled to the control apparatus 106 consisting, in the preferred embodiment, of the microprogrammed controllers and to the instruction register 104. The auxiliary processor 21 is also responsive to status signals from the remainder of the central processing unit 10. The auxiliary memory 22 stores the program signal groups and the data signal groups forming the test and verification procedures of the present invention. A test mode register 23 in the auxiliary processor 21 provides status information with respect to the operation of the test program.

Figure 3:
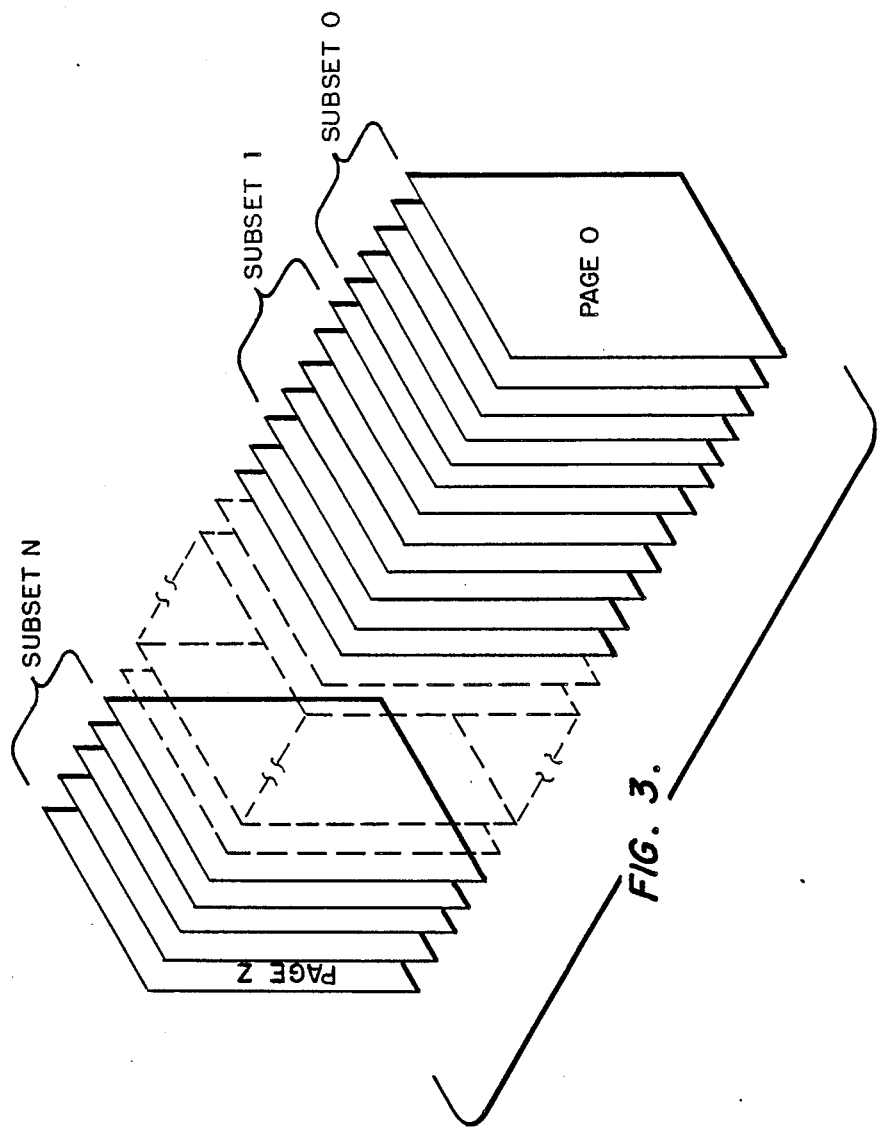
FIG. 3 illustrates the division of the central processing unit verification program into procedure subsets.

Referring next to FIG. 3, the partitioning of the central processing unit test program is illustrated. The test program is divided into pages, from Page O to Page Z. In the operable embodiment, the test program is divided into 162 pages, however, the number of pages in a given system will depend on the complexity of the system and, of course, the quantity of signals defined as a page of signals by the data processing system. In the operable embodiment in response to an external command to execute the test procedures, 5 pages of test and verification procedures will be executed before returning control of the central processing unit to the operating system.

Figure 4:
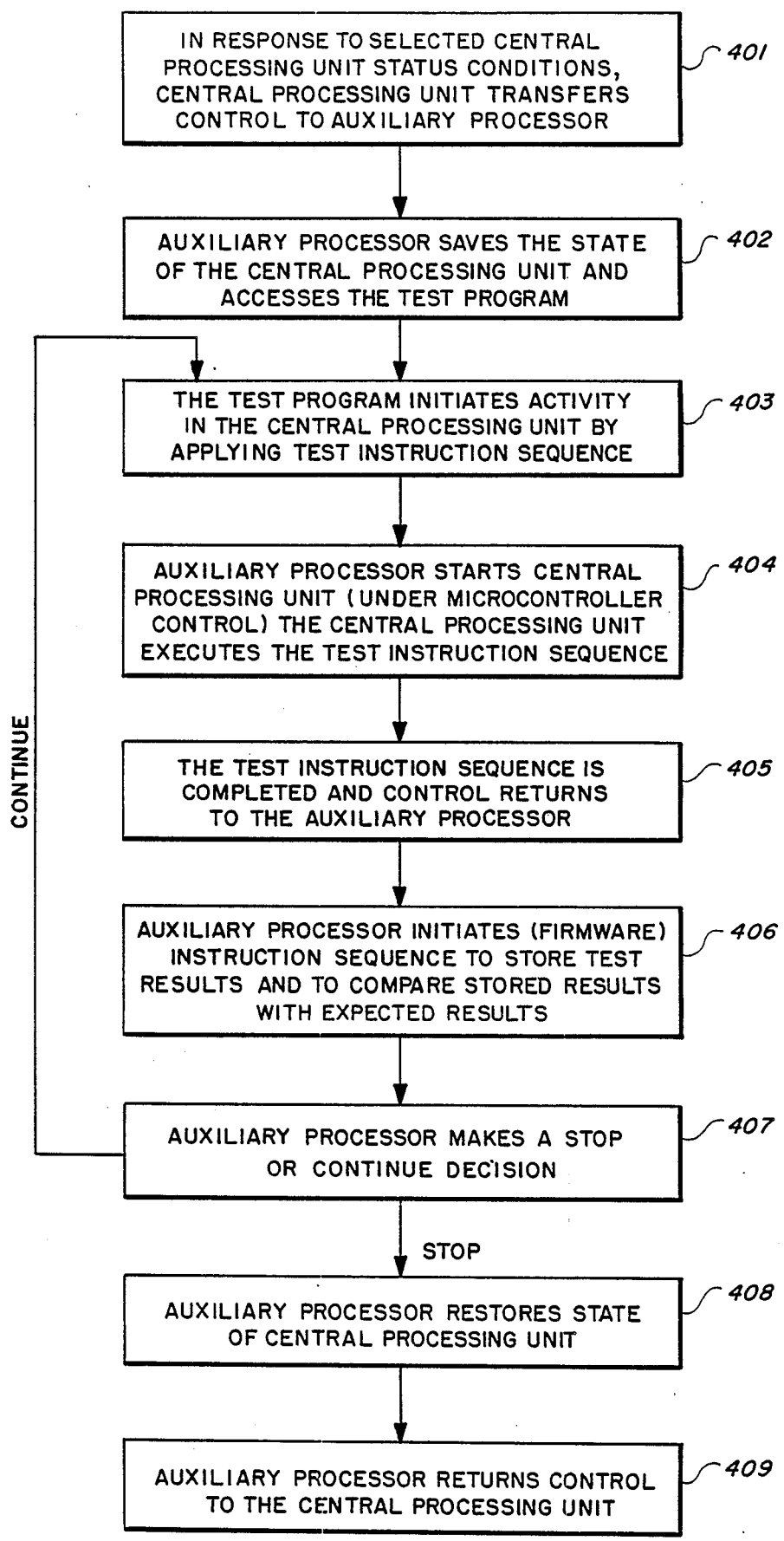
FIG. 4 is a flow diagram displaying the steps in executing a portion of the test procedure stored in a group of pages.

Referring to FIG. 4, the steps implementing the test procedure of the present invention are illustrated. In step 401, the test procedure is initiated in response to a preselected status of the central processing unit 10 by transferring control of the central processing unit to the auxiliary processor 21. In the preferred embodiment, the preselected condition can be a idle status of the central processing unit 10 or an external command that results in the execution of the test procedures. The test procedure is initiated by having the auxiliary processor 21 assume control of the central processing unit 10. In step 402, the auxiliary processor saves the state of a central processing unit 10, i.e., by causing the transfer of the contents of selected registers to the register array 105, and by accessing the appropriate test program in the auxiliary memory 22. In step 403, the signal groups of the test program are distributed to appropriate locations in the central processing unit 10 under control of the auxiliary processor 21. In step 404, the auxiliary processor 21 initiates the operation of the central processing unit 10, the central processing unit 10 executing the test program sequence supplied from the auxiliary memory 22. In the preferred embodiment, the execution of the test program sequence is under microprogram control. In step 405, after the test program sequence has been completed, the auxiliary processor 21 resumes control of the operation of the central processing unit. The auxiliary processor 21, having assumed control of the central processing unit 10, transfers the contents of selected registers to the register array 105 and executes a procedure whereby the stored resulting quantities are compared with expected resulting quantities in step 406. In step 407, the auxiliary processor 21 makes a decision to continue with a new test procedure sequence or to return control of the central processing unit 10 to the operating system. This decision can be based on the determination of an error condition and/or on the continued presence of the idle state, i.e., no instructions awaiting execution. For the test sequence procedure resulting from an external instruction, interruption of an executing sequence has occurred so that instructions will be present that are awaiting execution. When a decision is made to continue execution of a test procedure, then the auxiliary processor 21 accesses a test procedure in the auxiliary memory in step 403. When the decision is made to return control of the central processing unit 10 to the operating system, the auxiliary processor 21 returns the saved contents of the register array 105 (stored when the auxiliary processor 21 assumed control of the central processing unit 10) to the registers in the central processing unit 10, thereby restoring original state of the central processing unit 10 in step 408. In step 409, the auxiliary processor 21 returns control to the operating system and the central processing unit 10 continues with the normal instruction execution.

Figure 5:
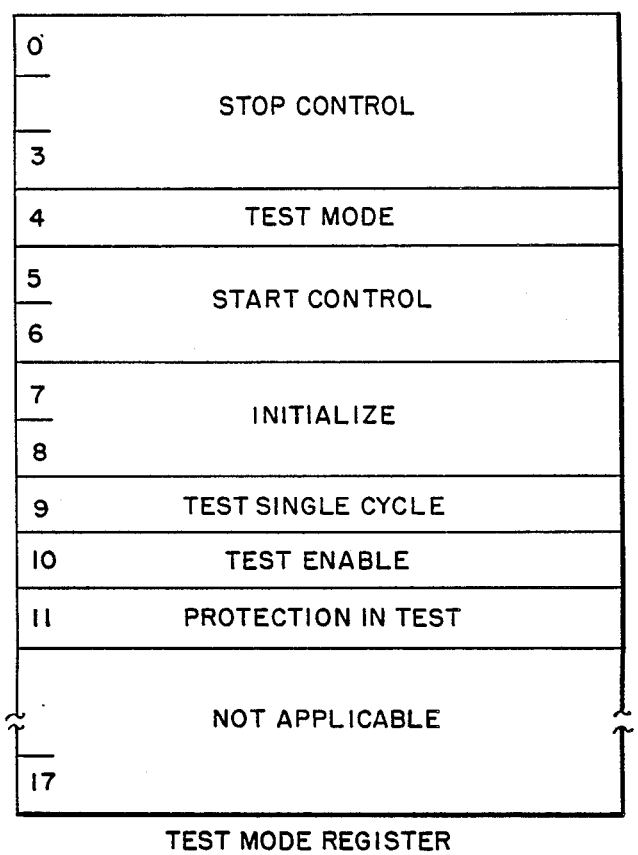
FIG. 5 illustrates the bit positions of the test mode register associated with the auxiliary processor.

Referring next to FIG. 5, the bit positions of the test mode register 23 of the auxiliary processor 21 are defined. Bit positions 0-3 define the circumstances for stopping operation of the test program. The test program can stop after a single instruction, after a single step, after a memory address, after a micro address, after a fault/error or is not to be stopped until the end of the procedure. Bit position 4 identifies the test program mode. Bit positions 5-6 identify the type of test program start, i.e., a normal start, a start for a given micro address and a start with the current RCS. Bit positions 7-8 identify initialization procedures which include no initialization, error reset procedure, initialize control procedure or an initialize clear procedure. Bit position 9 identifies the single cycle (debug) operation, while bit position 10 indicates that the test program is enabled. Bit position 11 prevents the central processing unit from stopping on a test procedure malfunction.

2. Operation of the Preferred Embodiment

The operation of the present invention can be understood in the following manner. A group of test programs is provided that exercises all of the apparatus in the central processing unit. The results of the test programs are also known. The group of test programs is divided into a multiplicity of test program sequences and the test program sequences are stored in the auxiliary memory. When an idle state is assumed by the central processing unit, the central processing unit transfers control of the central processing unit to the auxiliary processor. The auxiliary processor then loads data for the next sequential test program sequence into the cache memory unit and applies the corresponding instructions to the control apparatus of the central processing unit. (The next sequential test program sequence means the least most recently executed test program sequence). At the end of the test program sequence execution, the signal groups resulting from the test program execution are transferred to the register array in anticipation of return of control to the suspended program. The transferred signal groups are checked by the auxiliary processor to verify that the expected results had been achieved. In the preferred embodiment, the results are verified by summing the signal groups stored in the register array. When no procedure is waiting execution, then the auxiliary processor can execute the next least recently executed program sequence. The second mode of test program execution, i.e., in response to an external command, occurs when a test program sequence has not been executed for a predetermined time. After the predetermined time, the central processing unit initiates an interrupt of the currently executing procedures to execute a test procedure. Because of the efficiencies resulting from the interruption of a currently executing program, a plurality of test program sequences are executed. In the operable embodiment, 5 pages of test program procedures are executed in response to the external command before returning control to the operating system.

In the preferred embodiment of the present invention, two test modes are available. The cache test mode provides for operation of the central processing unit on instructions entered from the cache memory unit. During the execution the instructions from the cache memory unit, the cache memory unit is in control of the central processing unit. The basic test mode is reminiscent of the related art and permits the step by step sequencing of the component apparatus wherein the instructions to the control apparatus originate from the test program under control of the auxiliary processor. In either mode, completion of the test program, initiated in response to central processing system idle state, returns control to the central processing unit. In the preferred embodiment, a status register is included as part of the central processing unit. Three bit positions out of twelve bit positions include information concerning the nature of a malfunction detected by the test program, the status register also including a bit position indicating successful completion of the test program.

The present invention provides for the execution of test procedures for the central processing unit that operates in a manner similar to the actual operation of the central processing unit, i.e., at the frequency of the system clock. In addition, the cache memory unit is exercised, again in a manner similar to the actual operation of the central processing unit. By dividing the entire test procedures into a plurality component test procedure and by initiating a component test procedure during an idle state of the central processing unit, the test procedure can be executed component by component during a period of relative inactivity for the central processing unit, thereby minimizing the impact of the test procedure on the performance of the central processing unit.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Apparatus for testing the operation of a central processing unit of a data processing system; said central processing unit processing instruction operands and data operands; said central processing unit having an execution unit, controller components, an operand register array, an instruction register, and a cache memory unit; said apparatus comprising:
   an auxiliary memory included in said central processing unit, said auxiliary memory storing a test program including test data operands and test instruction operands;
   an auxiliary processor included in said central processing unit, said auxiliary processor coupled to said auxiliary memory for initiating execution of said test program; and
   coupling means for coupling instruction operands in said test program to controller components of said central processing unit in a first mode of operation, said coupling means coupling instruction operands to said cache memory unit in a second mode of operation.

2. The central processing unit testing apparatus of claim 1 further comprising a register array for storing central processing unit operands during execution said test program.

3. The central processing unit testing apparatus of claim 1 wherein said central processing unit includes microprogram control apparatus for controlling processing activity of said central processing unit, said coupling means coupling said test program operand instructions directly to said microprogram control apparatus in said first mode of operation.

4. The central processing unit testing apparatus of claim 1 wherein said test program is divided into a plurality of test program sequences, said test program sequences being organized into groups of test program sequences, a least most recently executed group of test program sequences being executed when a test program group has not been executed for a predetermined period of time.

5. The central processing unit testing apparatus of claim 4 wherein said group of test programs is initiated by an external instruction.

6. The central processing unit testing apparatus of claim 5 wherein said auxiliary processor includes a test mode register, said test mode register providing status information with respect to said test program.

7. The central processing unit testing apparatus of claim 1 wherein said test program is initiated in response to an idle state of said central processing unit.

8. The central processing unit testing apparatus of claim 7 wherein said test program is a one of a plurality of test programs, said plurality of test programs testing all of said central processing unit, wherein each of said plurality of test programs is executed in consecutive order.

9. The method for testing a central processing unit, said method comprising the steps of:
   storing a central processing unit test programs in said central processing unit;
   transferring control of operation of said central processing unit from an operating system to an auxilliary processor, said auxiliary processor being a part of said central processing unit;
   applying instruction operands to a cache memory unit of said central processing unit in a first mode of operation of said auxiliary processor in response to a selected test program when said selected test program is a one of a first group of test programs;
   applying instruction operands directly to control apparatus of said central processing unit in a second mode of operation of said auxiliary processor in response to said selected test program when said selected test program is a one of a second group of test programs;
   transferring control of said central processing unit to selected said test programs;
   exercising components of said central processing unit under control of said selected test program;
   transferring control of said central processing unit to said auxiliary processor;
   comparing results of said selected test program with expected results; and
   returning control of said central processing unit to said operating system.

10. The method of testing a central processing unit of claim 9 further comprising the step of storing selected operands from said central processing unit prior to transferring control of central processing unit from said operating system to said auxiliary processor.

11. The method of testing a central processing unit of claim 9 further comprising the step of dividing said test programs into a multiplicity of independently executable test program sequences, said multiplicity of test program sequences each being capable of execution during an idle state of said central processing unit with minimum impact on the performance of said central processing unit.

12. The method of testing a central processing unit of claim 11 wherein said each of said multiplicity of test program sequences is cyclically executed in a predetermined order.

13. The method of testing a central processing unit of claim 9 wherein the step of said transferring control of operation of said central processing unit from an operating system is initiated in response to an idle state of said central processing unit.

14. The method of testing a central processing unit of claim 9 wherein said central processing unit is controlled by microprogram control apparatus, said exercising step including the step of applying instruction operands from said test program directly to said microprogram control apparatus in said second mode of operation.

15. A central processing unit of a data processing system, said central processing unit comprising:
   an execution unit for processing data operands in response to instruction operands;
   a cache memory unit for storing instruction and data operands, said cache memory unit providing an interface for exchange of data and instruction operands between said central processing unit and said data processing system;
   control apparatus for controlling operation of said execution unit and said cache memory unit;

storage means for storing a plurality of independent test programs, said test programs including test instruction operands and test data operands; and processor means for transferring control of said central processing unit to a one of said test programs, wherein instruction operands of said one test program can be applied to said control apparatus in a first mode of operations, said instruction operands of said one test program being transferred to said cache memory unit in a second mode of operation.

16. The central processing unit of claim 15 wherein transfer of control of said central processing unit to said one test program is performed by said processing means in response to an idle state of said central processing unit.

17. The central processing unit of claim 15 wherein said test programs consist of a multiplicity of test procedures, each of said test procedure capable of being executed during an idle period in an operation of said central processing unit.

18. The central processing unit of claim 15 wherein said control apparatus includes microprogram control apparatus, said processor means causing instruction operands from said test program to be applied to said microprogram control apparatus in said first mode of operation.

* * * * *